United States Patent [19]

Klein et al.

[11] Patent Number: 4,476,624
[45] Date of Patent: Oct. 16, 1984

[54] METHOD FOR MAKING SPIRALLY WOUND CELLS

[75] Inventors: Gerhart Klein, Manchester; Michael J. Mitchell, Jr., Lynnfield, both of Mass.

[73] Assignee: Duracell Inc., Bethel, Conn.

[21] Appl. No.: 351,816

[22] Filed: Feb. 24, 1982

[51] Int. Cl.³ .............................................. H01M 6/00
[52] U.S. Cl. .................................. 29/623.1; 29/623.3; 228/106; 228/116; 429/94
[58] Field of Search ................. 29/623.3, 623.1, 623.2, 29/623.4, 730; 429/94; 228/106, 115, 116

[56] References Cited

U.S. PATENT DOCUMENTS

| | | | |
|---|---|---|---|
| 3,618,843 | 11/1971 | Hayes et al. | 228/115 |
| 4,052,537 | 10/1977 | Mallory | 29/623.2 |
| 4,053,687 | 10/1977 | Coibion et al. | 429/94 |
| 4,099,401 | 7/1978 | Hug et al. | 29/623.1 |

*Primary Examiner*—Howard N. Goldberg
*Assistant Examiner*—P. W. Echols
*Attorney, Agent, or Firm*—Ronald S. Cornell; Israel Nissenbaum

[57] ABSTRACT

A method for making spirally wound cells using a deformed metal strip mandrel with an electrode being forced therein by a compressing element fixedly retained by the mandrel to hold the electrode during winding. The electrode is electrically connected to the mandrel by the compressing force.

3 Claims, 3 Drawing Figures

METHOD FOR MAKING SPIRALLY WOUND CELLS

The present invention relates generally to a method and apparatus for forming electrochemical cells and, more particularly pertains to a mandrel winding assembly which centrally winds the elements about the mandrel assembly within a cell.

The present invention provides a novel mandrel assembly which efficiently and economically winds the components within a lithium-$SO_2$ type cell. The mandrel assembly is securely attached to separator layers and a lithium anode in a fashion which facilitates easy winding therearound.

Spirally wound or "jelly roll" cells have been generally constructed utilizing coiling elements such as mandrels around which the interleaved cell components are wrapped. The mandrel may be part of the winding apparatus and withdrawn from the cell after the coiling operation as for example in U.S. Pat. Nos. 4,064,725; 4,099,401; 4,000,351 and 3,734,778 all issued to Hug et al.

This method is preferred particularly for "NiCad" or alkaline cells since it provides an empty volume for evolved gas accumulation.

Alternatively, the mandrel may remain within the cell to serve as an electrode terminal or current collector as in U.S. Pat. No. 3,510,353 issued to McHenry. The mandrel described in the McHenry patent consists of a metal tube with an inner plastic sleeve through which an electrode wire contact is threaded. The tube and sleeve are crimped against the wire to provide positive contact. After winding the wire is affixed to one of the electrodes for completion of the terminal connection. The utilization of such mandrel, however, does not assure non-slippage and uniformity during winding.

It is an objective of the present invention to provide a novel and improved method and apparatus for the winding of elements to form an electrochemical cell.

Another object of the present invention is to provide an economical method and apparatus for securely winding the elements within such cell.

Still, a further object of the present invention is to provide an effective electrical connection between the wound electrode material contained with the cell and the cover of the cell which acts as a terminal therefor.

The foregoing and other objects, advantages and characterizing features of the invention method and apparatus herein described will become more readily apparent from the following detailed description taken in conjunction with the accompanying drawings wherein like reference numerals denote similar parts throughout the various views and in which.

Generally, the present invention comprises a method for constructing spirally wound electrochemical cells and the mandrel apparatus utilized in such construction. The novel mandrel is comprised of an elongated longitudinally deformed metal strip and a compression element adapted to fit within the deformity of the metal strip. Preferably the metal strip is of a uniform enclosing configuration such as of a "U" or "C" shaped cross section and the compression element is preferably a solid plastic rod. During the construction of the cell an electrode such as lithium with separator elements on both sides thereof is placed within the deformity with the compression element compressing and fixedly positioning the electrode into the deformity of the mandrel. The compression element is then locked into position such as by crimping the mandrel therearound to positively hold the electrode in place during subsequent winding. With an anode metal electrode such as of lithium, a percut opening in the separator element adjacent the mandrel permits contact and cold welding between the anode metal and the mandrel during the compression step.

In order to complete the cell, the cathode is interleaved, after the first winding of the mandrel, with the anode. The mandrel is retained within the finished cell as the anode terminal. Accordingly, it is preferred in cells having aerosol seals with top pedestals such as in U.S. Pat. No. 4,052,537 that the mandrel be sized to be press or frictionally fit into the top pedestal of the cell in order to simplify anode terminal connection thereby.

Figure 1:
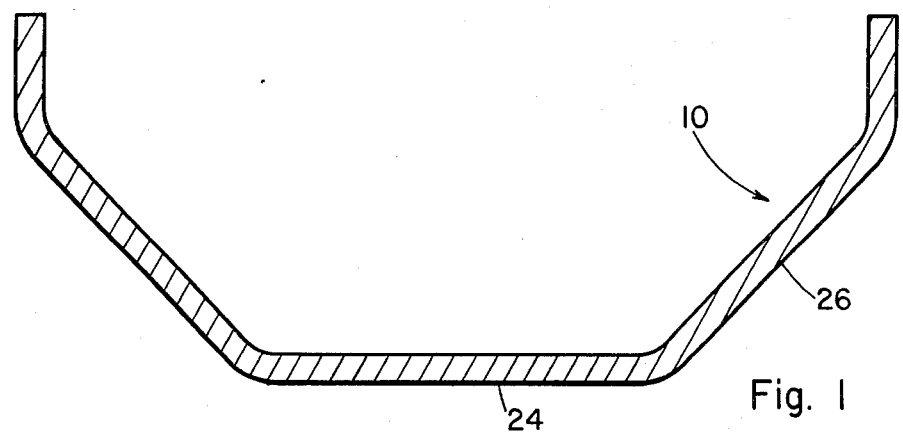
FIG. 1 is a side cross-sectional view of the mandrel according to the present invention.
Figure 2:
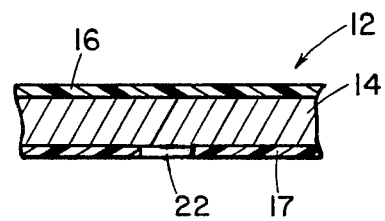
FIG. 2 is a side cross-sectional view, with portions broken away, of the layer assembly of the present invention.

Referring now to the drawings in detail, in FIG. 1 there is shown a cross section of a mandrel 10 prior to winding, deformed into a generally shallow U-shaped configuration which facilitates easy assembly with the other elements of the cell in accordance with the present invention. In one embodiment, the mandrel 10 has an overlength of approximately four and one-half inches and is normally constructed out of stock sheet metal. The thickness of the sheet metal is suitably between about 0.01 and about 0.025 inches (0.025 and 0.064 cm), and the thickness is preferably about 0.017 inches (0.043 cm). The metal is also preferably of a medium hardness to facilitate further deforming in a subsequent crimping operation. FIG. 2 depicts a cross-sectional view of a layer assembly 12 of the flexible elements which are to be wound around the mandrel. An anodic material 14, preferably made of lithium foil, has a layer of separator material 16, 17 on each side thereof. Bottom separator 17 has an opening 22 which is preferably cut in the form of a slot in order to allow some of anodic material, e.g., lithium, to be exposed therethrough.

Figure 3:
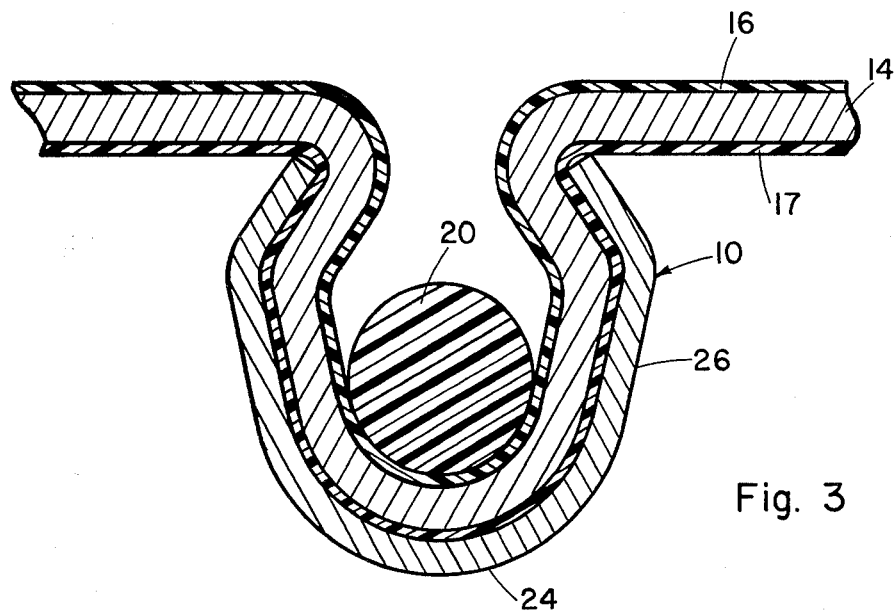
FIG. 3 is a side view, with portions broken away, and partially in cross-section of the assembled mandrel assembly of the present invention.

FIG. 3 shows the completed mandrel assembly of the present invention just prior to winding the flexible layer assembly therearound. The mandrel 10 has an inserting compression element 20 placed therein. The element 20 normally has a cylindrical configuration and is made out of a polymeric plastic material, preferably polypropylene. The inserting element 20 may be of any configuration, such as rectangular, which will enable it to longitudinally fit within mandrel 10. Element 20 is lowered into mandrel 10 thereby trapping layer assembly 12 therebetween. Upon insertion, pressure is applied between inserting element 20, which in the embodiment shown, is a plastic rod and the bottom face 24 of the mandrel 10. This pressure causes the anodic material 14 to penetrate opening 22 within the lower separator 17 and to become cold welded to the metal bottom 24 of the mandrel 10. Subsequently, after the rod 20 is in place the sides 26 of the mandrel 10 are crimped together by any tool (not shown) suitable for such an operation. Upon the partial closing, or crimping, of the sides of the mandrel 10, the inserting element 20 is snugly held due to the compressive forces between mandrel 10 and element 20 and frictional forces between layer assembly 12 and each of said mandrel 10 and element 20.

Mandrel 10 is then rotated about its longitudinal axis by any well known drive means (not shown) to subsequently wind the layer assembly 12 therearound. A cathode layer (not shown) is interleaved after the first rotation to provide the requisite complete cell "jelly roll" configuration. The mandrel 10 is retained within the finished cell and is mechanically connected to the cell top such as by a press fit within a cell top pedestal such as in a cell having an aerosol seal structure. As a result of this process, mandrel 10 acts as the electrical connection between anodic material 14 and the top (not shown) of the cell.

Although a preferred embodiment of the principles of this invention has been described and illustrated in detail herein, it should be realized that the same is not limited to the particular configuration shown in the drawings, and that modifications thereof are contemplated and can be made without departing from the broad spirit and scope of this invention as defined in the appended claims.

What is claimed is:

1. A method of making a spirally wound cell comprising winding anode electrode members of said cell around a mandrel and retaining said mandrel within said cell characterized in that said method comprises the step of fixedly positioning a portion of an anode of said cell, which is enclosed between separating elements, between said mandrel and a compression element whereby said portion of an anode is compressively retained therebetween during said winding and wherein the separating element, between the anode and the mandrel, has an aperture therein whereby the fixed positioning of said portion of an anode with said compression element simultaneously electrically connects the anode to said mandrel through said aperture.

2. The method of claim 1 wherein said compression element fits within said mandrel and is fixedly retained therewithin.

3. The method of claim 1 wherein said mandrel is inserted within a portion of the container of said cell sized to frictionally fit therewith whereby electrical connection from said anode to said portion of the container is effected thereby.

* * * * *